No. 825,707. PATENTED JULY 10, 1906.
S. L. EASTEY.
METER CONNECTION.
APPLICATION FILED OCT. 20, 1905.

2 SHEETS—SHEET 1.

INVENTOR
Samuel L. Eastey
By Dudley, Browne & Writer
his Attorneys

WITNESSES:

THE NORRIS PETERS CO., WASHINGTON, D. C.

No. 825,707. PATENTED JULY 10, 1906.
S. L. EASTEY.
METER CONNECTION.
APPLICATION FILED OCT. 20, 1905.
2 SHEETS—SHEET 2.
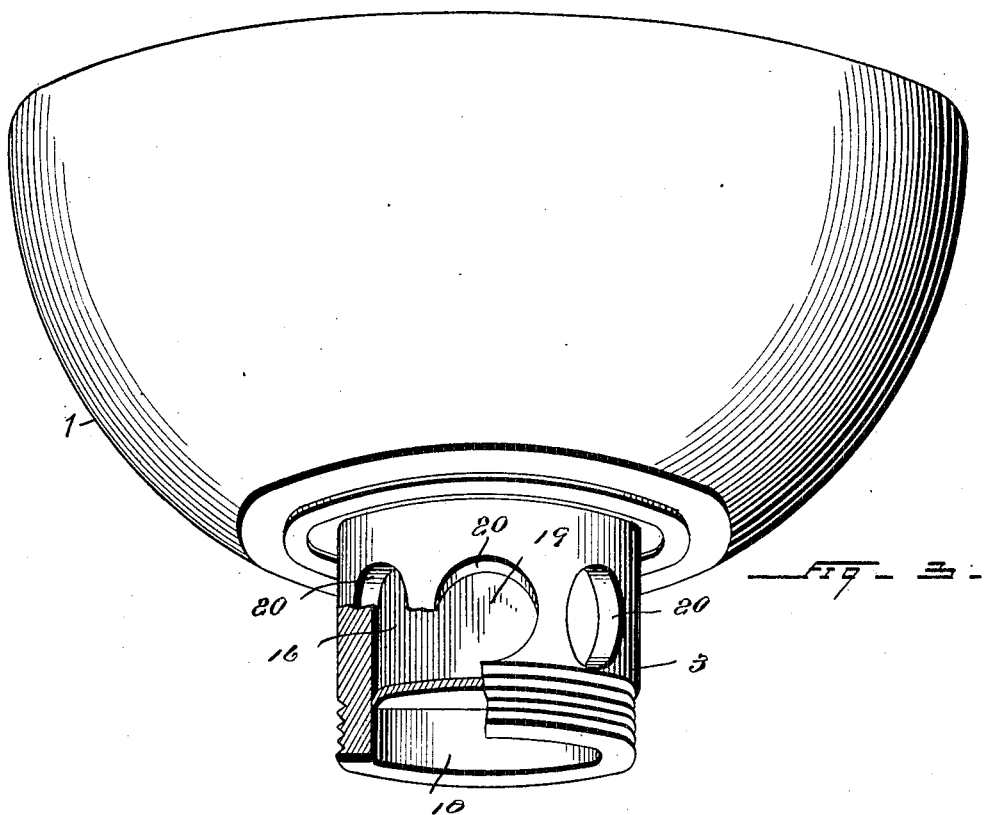
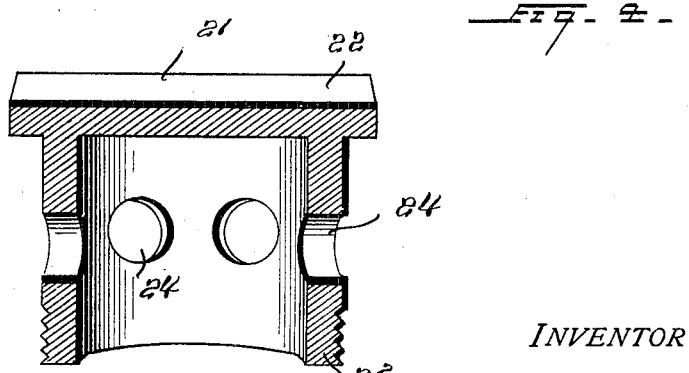
INVENTOR
Samuel L. Eastey
BY
his Attorneys
WITNESSES:

UNITED STATES PATENT OFFICE.

SAMUEL L. EASTEY, OF WINONA, MINNESOTA, ASSIGNOR OF ONE-HALF TO WILLIAM HENRY BRUST, OF WINONA, MINNESOTA.

METER CONNECTION.

No. 825,707.  Specification of Letters Patent.  Patented July 10, 1906.

Application filed October 20, 1905. Serial No. 283,681.

*To all whom it may concern:*

Be it known that I, SAMUEL L. EASTEY, a citizen of the United States, residing at Winona, in the county of Winona and State of Minnesota, have invented certain new and useful Improvements in Meter Connections; and I do hereby declare the following to be a full, clear, and exact description of the invention, such as will enable others skilled in the art to which it appertains to make and use the same.

This invention relates to measuring instruments and contemplates the production of an improved fitting for connecting a meter with the service-pipe. The fitting, which is more especially designed for use in connection with water-meters, is constructed with the view to dispensing with the pair of necks usually provided in meters, an object of the improvement being to provide a T or other fitting adapted for attachment to a meter having a single neck partitioned to obtain the passages to and from the measuring-chamber, whereby the structure is greatly simplified, the liability to leakage is materially lessened, and a reduction in the time and labor consumed in inserting and removing a meter is obtained.

The invention in detail is set forth in the following description and illustrated in the accompanying drawings. The drawings show a meter connection embodying the preferred features of construction; but such showing is not to be regarded as a limitation, as various modifications may be made therein without exceeding the scope of the concluding claims.

Figure 1:
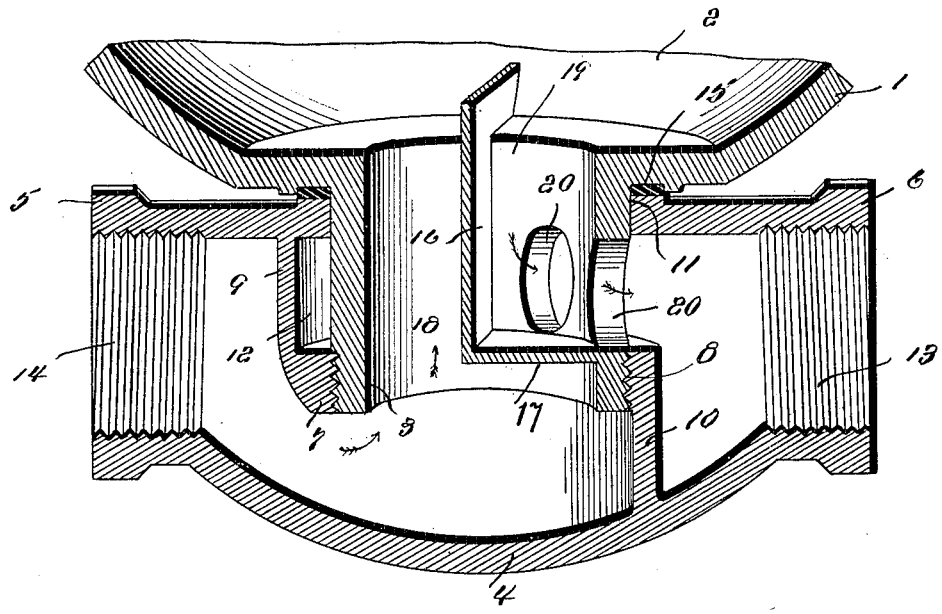
Figure 2:
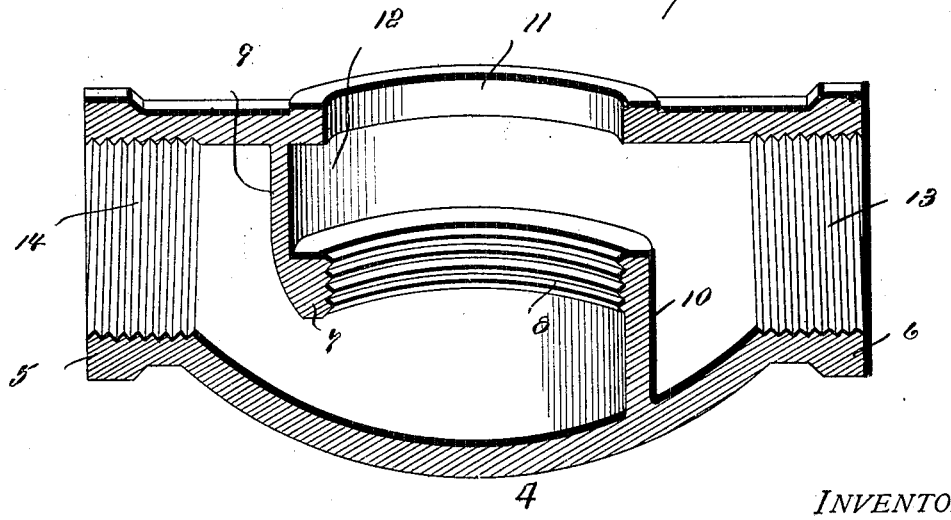

In the drawings, Figure 1 is a vertical central sectional view of a single connection for meters embodying the invention. Fig. 2 is a detail sectional view of the T forming a part of the connection. Fig. 3 is a detail view of the base portion and single neck of the meter. Fig. 4 is a detail sectional view of a closure employed while the meter is disconnected.

Referring to the drawings by numerals, 1 designates the meter-casing, in which is a measuring-chamber 2 and from which extends an open-ended neck 3, screw-threaded exteriorly at its lower end.

4 is a fitting—for example, a T—the internally-threaded ends 5 6 of which are connected with sections of the service-pipe. (Not shown.) In the fitting is a horizontal partition 7, disposed, preferably, below the center, and in the partition is a circular screw-threaded opening 8, into which is screwed the lower end of the neck 3. Integral with the partition 7 and the shell of the fitting are oppositely-extending vertical partitions 9 10. The upper partition 9 is located beyond the opening 8 and a guiding-opening 11 in the top of the shell sufficiently to provide an annular chamber 12, which surrounds the neck and communicates with the passage 13 in the outlet end 6 of the fitting. The opening 11 is unthreaded and serves to guide the neck as it is inserted and screwed into the opening 8. The screw connection between the neck and fitting being at the partition 7, leakage from the passage 14 into the chamber 12 is prevented, and a gasket 15, encircling the neck and interposed between the casing 1 and top of the shell, prevents leakage at the opening 11.

In the neck 3 is a vertical partition 16, joining a horizontal partition 17, extending from the lever end of the partition 16 to the neck at one side, said partitions forming a passage 18, leading from the passage 14 into the measuring-chamber, and a passage 19, leading from said chamber. Communication between the passages 19 and 13 is established by one or more holes 20 in the neck 3. The areas of the fitting passages and chambers are proportioned with reference to the other areas to obtain an uninterrupted flow of the water, and this regardless of the extent to which the neck is inserted in the fitting. In other words, the insertion of a thick or thin gasket between the shell and casing will not affect the proper working of the connection.

It will be understood from the foregoing that the water flows through passages 14 and 18 into the meter and is there measured and flows thence through the passage 19, openings 20, chamber 12, and passage 13.

When the meter is disconnected, the fitting is closed at the opening 11 by a cap 21, consisting of a head 22 and a hollow threaded neck 23, which is screwed into the opening 8. The water has an uninterrupted flow through the fitting, holes 24 being provided, which establish communication between the shell-passages 14 and 13.

I claim as my invention—

1. The combination with a meter-casing, of a neck extending therefrom and threaded at its lower end, a partition in said neck to divide the same into inlet and outlet openings, a fitting provided with a partition dividing it into two chambers, said partition being provided with a threaded opening with which the threaded portion of the neck is adapted to engage.

2. The combination with a meter-casing, of a neck extending therefrom and threaded at its lower end, a partition in said neck to divide the same into inlet and outlet openings, a partition extending at right angles from said first-mentioned partition to the side wall of the neck, the said wall of the neck being provided with openings leading into said partitioned-off portion, a fitting provided with a partition dividing said fitting into two chambers, said last-mentioned partition being provided with a threaded opening with which the threaded neck is adapted to engage.

3. The combination with a meter-casing, of a neck extending therefrom and threaded at its lower end, a partition in said neck to divide the same into inlet and outlet openings, a partition extending from said first-mentioned partition to the side wall of the neck and openings through the neck in said partitioned-off portion, a fitting provided with a partition dividing said fitting into two chambers, said partition being provided with a threaded opening, said fitting being provided with an opening in line with said threaded opening, whereby the neck of the meter-casing is adapted to pass through said opening in the fitting and the threads on the end of the neck engage the threaded opening in the partition of the fitting.

4. The combination with a meter-casing, of a neck extending therefrom and threaded at its lower end, a partition in said neck to divide the same into inlet and outlet openings, a fitting provided with a partition dividing said fitting into two chambers, said partition being provided with a threaded opening, and said fitting being provided with an opening in line with said threaded opening, the threaded end of the neck being adapted to engage the threaded opening in the partition whereby the neck will pass through the opening in the fitting and draw the meter-casing into engagement with the fitting and a gasket interposed between the fitting and the meter-casing.

In testimony whereof I affix my signature in presence of two witnesses.

SAMUEL L. EASTEY.

Witnesses:
D. E. TAWNEY,
W. J. SMITH.